(12) United States Patent
Wuest et al.

(10) Patent No.: US 12,375,526 B2
(45) Date of Patent: Jul. 29, 2025

(54) DETECTION OF MALICIOUS PHISHING EMAILS

(71) Applicant: Acronis International GmbH, Schaffhausen (CH)

(72) Inventors: Candid Wuest, Bassersdorf (CH); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 138 days.

(21) Appl. No.: 18/345,086

(22) Filed: Jun. 30, 2023

(65) Prior Publication Data
US 2025/0007950 A1    Jan. 2, 2025

(51) Int. Cl.
H04L 29/06    (2006.01)
H04L 9/40    (2022.01)

(52) U.S. Cl.
CPC ............................... *H04L 63/1483* (2013.01)

(58) Field of Classification Search
CPC  H04L 63/1425; H04L 63/029; H04L 63/1416
See application file for complete search history.

(56) References Cited

U.S. PATENT DOCUMENTS

| | | | |
|---|---|---|---|
| 10,158,677 B1 * | 12/2018 | DiCorpo | H04L 63/145 |
| 10,382,459 B2 | 8/2019 | Harris et al. | |
| 10,917,435 B2 | 2/2021 | Stupak et al. | |
| 11,075,930 B1 * | 7/2021 | Xavier | H04L 63/20 |
| 11,609,988 B2 | 3/2023 | Strogov et al. | |
| 2007/0208613 A1 | 9/2007 | Backer | |
| 2014/0096249 A1 * | 4/2014 | Dupont | G06F 21/00 726/23 |
| 2018/0191776 A1 * | 7/2018 | Irimie | G06F 40/186 |
| 2019/0058736 A1 * | 2/2019 | Stupak | H04L 63/20 |
| 2019/0260780 A1 * | 8/2019 | Dunn | G06F 18/232 |

(Continued)

OTHER PUBLICATIONS

Acronis. Avoid a phishing attack. Dec. 21, 2018. https://www.acronis.com/en-sg/blog/posts/phishing/, Avoid a phishing attack—Acronis.pdf.

(Continued)

*Primary Examiner* — Wasika Nipa
(74) *Attorney, Agent, or Firm* — ESPE Legal Consultancy FZ- LLC

(57) ABSTRACT

Systems and methods for detecting a phishing attack in an email message. The method includes intercepting and evaluating an email, and generating a reputation score based on the evaluation of the email message. If the malicious component is detected, the email is blocked, if not, a trust score is generated. A determination is made whether the email is generated by AI, based on LLM. A certainty score is generated which is indicative of intentions and context of the email message being malicious. When the certainty score is higher than a threshold, a combined score by combining the reputation score, the trust score, and the certainty score. When the combined reputation score is higher than a threshold, the email is blocked, and if lower, a summary is generated by a summary AI engine. Based on a comparison with known malware summaries, the email is flagged or blocked.

20 Claims, 5 Drawing Sheets

(56) References Cited

U.S. PATENT DOCUMENTS

2022/0121742 A1\* 4/2022 Strogov ............... G06F 21/554
2023/0021885 A1   1/2023 Maha et al.

OTHER PUBLICATIONS

Acronis. Advanced Email Security. https://www.acronis.com/en-eu/products/cloud/cyber-protect/email-security/, Cloud Email Security Solution & Email Threat Protection for MSP—Acronis.pdf Feb. 29, 2024 as accessed.

SEO.AI's Content Team. AI Content Detection: How ChatGPT and AI-Generated Text is Found. May 16, 2023. https://seo.ai/blog/ai-content-detection, AI Content Detection_How ChatGPT and AI-Generated Text Is Found.pdf.

\* cited by examiner

DETECTION OF MALICIOUS PHISHING EMAILS

TECHNICAL FIELD

The present disclosure relates generally to email security. More specifically, the present disclosure relates to detecting and mitigating email-based threats such as phishing emails and other malicious communications.

BACKGROUND

Email has become an essential communication tool for individuals and organizations worldwide. However, the widespread use of email has also led to an increase in email-based threats, such as phishing attacks and malware distribution. These threats often rely on social engineering techniques to deceive users into revealing sensitive information or executing malicious actions.

Phishing attacks are a type of attack where the attacker poses as a legitimate institution or individual to trick the recipient into providing sensitive data. This data can include personal identification information, banking and credit card details, and passwords. The attacker typically uses email, telephone, or text message to lure the victim, hence the term "phishing." With the advent of artificial intelligence (AI), phishing attacks have become more sophisticated. AI can be used to automate the process of creating and sending phishing emails, making them more convincing and harder to detect. AI-generated emails can be highly convincing, with well-written text blocks that are free of grammar mistakes and personalized using information from social media. This increased professionalization makes it more difficult for users to identify malicious emails, necessitating the development of advanced detection methods.

There is a need for improved methods and systems for detecting and mitigating email-based threats including those generated by AI, which can effectively address the limitations of existing email security solutions.

SUMMARY

Embodiments described or otherwise contemplated herein substantially meet the aforementioned needs of the industry. The present disclosure relates to systems and methods for detecting malicious and phishing emails.

In an embodiment, a method of detecting a phishing attack in an email message includes intercepting the email message: evaluating the email message using at least one static attribute; generating a reputation score based on the evaluation of the email message, and detecting, based on the reputation score, whether the email message contains a malicious component; and when the malicious component is detected in the email message: blocking the email message containing the malicious component: when the malicious component is not detected in the email message: analyzing a trust graph of a sender-receiver pair for the email message, generating a trust score based on the analyzing the trust graph, determining whether artificial intelligence (AI) wrote the email message using a large language model (LLM)-based generative AI model, when the email message is written by the AI, generating a certainty score indicative of intentions and context of the email message being malicious, when the certainty score is higher than a predefined certainty threshold, generating a combined score by combining the reputation score, the trust score, and the certainty score, when the combined score is higher than a predefined combined threshold: blocking the email message, when the combined score is lower than the predefined combined threshold: generating a plurality of summaries of content of the email message using a summary AI engine, comparing the plurality of summaries of the content against known malicious emails, and blocking or marking the email message if the plurality of summaries matches one of the known malicious emails.

In one aspect, analyzing the trust graph of the sender-receiver pair further comprises using a pre-trained model based on a relationship of the sender-receiver pair.

In one aspect, generating the plurality of summaries includes instructing the summary AI engine to generate a summary using an n-tuple pair.

In one aspect, a method further comprises training the generative AI model with recent malicious emails, clean emails, and historical data from a customer environment.

In one aspect, at least one static attribute includes header information including at least one of a Sender Policy Framework (SPF) record, a Domainkeys Identified Mail (DKIM) record, a Domain-based Message Authentication Reporting and Conformance (DMARC) record, a reputation score for the sender, an email server, a URL in a message body, an attachment, or a keyword search of the message body.

In one aspect, a method further comprises detecting similarities in a plurality of email messages using the generative AI model: initiating, if the similarities are above a predefined limit and the plurality of email messages are not identified as malicious, a counter to count a number of similar email messages in a predefined time period; and blocking the plurality of email messages if the number is beyond a predefined limit.

In one aspect, a method further comprises receiving a search request from a user for a particular email message in blocked emails; when the particular email message is found, using the generative AI model, in the blocked emails: informing the user, and depending on the trust score, automatically retrieving the email message from the blocked emails or asking the administrator to approve the retrieval of the particular email message from the blocked emails.

In one aspect, a method further comprises generating synthetic malicious email text using the generative AI model; and testing an email security solution using the synthetic malicious email text.

In one aspect, a method further comprises determining whether the email message was already marked malicious from a previous determination; and when the email message was declared malicious, marking the email message as malicious for future searches.

In an embodiment, a system for detecting a phishing attack in an email message includes a hardware processor implemented on a computing device; and instructions that, when executed on the hardware processor, cause the hardware processor to implement: an interceptor configured to intercept the email message, an evaluator to configured evaluate the email message using at least one static attribute, a score generator configured to generate a reputation score based on the evaluation of the email message, a malware detector configured to detect, based on the reputation score, whether the email message contains a malicious component, and configured to block the email message containing the malicious component when the malicious component is detected in the email message: a phishing detector configured to, when the malicious component is not detected in the email message: analyze a trust graph of a sender-receiver pair for the email message, generate a trust score based on the analyzing the trust graph, determine whether artificial intelligence (AI) wrote the email message using a large language model (LLM)-based generative AI model, when the email message is written by the AI, generate a certainty score indicative of intentions and context of the email message being malicious, when the certainty score is higher than a predefined certainty threshold, generate a combined score by combining the reputation score, the trust score, and the certainty score, when the combined score is higher than a predefined combined threshold: block the email message, when the combined score is lower than the predefined combined threshold: generate a plurality of summaries of content of the email message using a summary AI engine, compare the plurality of summaries of the content against known malicious emails, and block the email message if the plurality of summaries matches one of the known malicious emails.

In an embodiment, a generative artificial intelligence (AI) model pretrained on a large language model (LLM) based on data related to phishing emails, wherein the generative AI model is trained to, including: determine if artificial intelligence wrote an intercepted email; search an email summary database using a first n-tuple applied to a summary of the intercepted email to determine if the intercepted email is similar to at least one of a plurality of emails in the email summary database; and generate a plurality of synthetic emails based on the intercepted email to input into the email summary database.

In one aspect, the generative AI model is further trained to: search an email summary database using a second n-tuple to determine if the intercepted email is similar to at least one of a plurality of emails in the email summary database, wherein the second n-tuple includes a greater number of words in the tuple than the first n-tuple.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
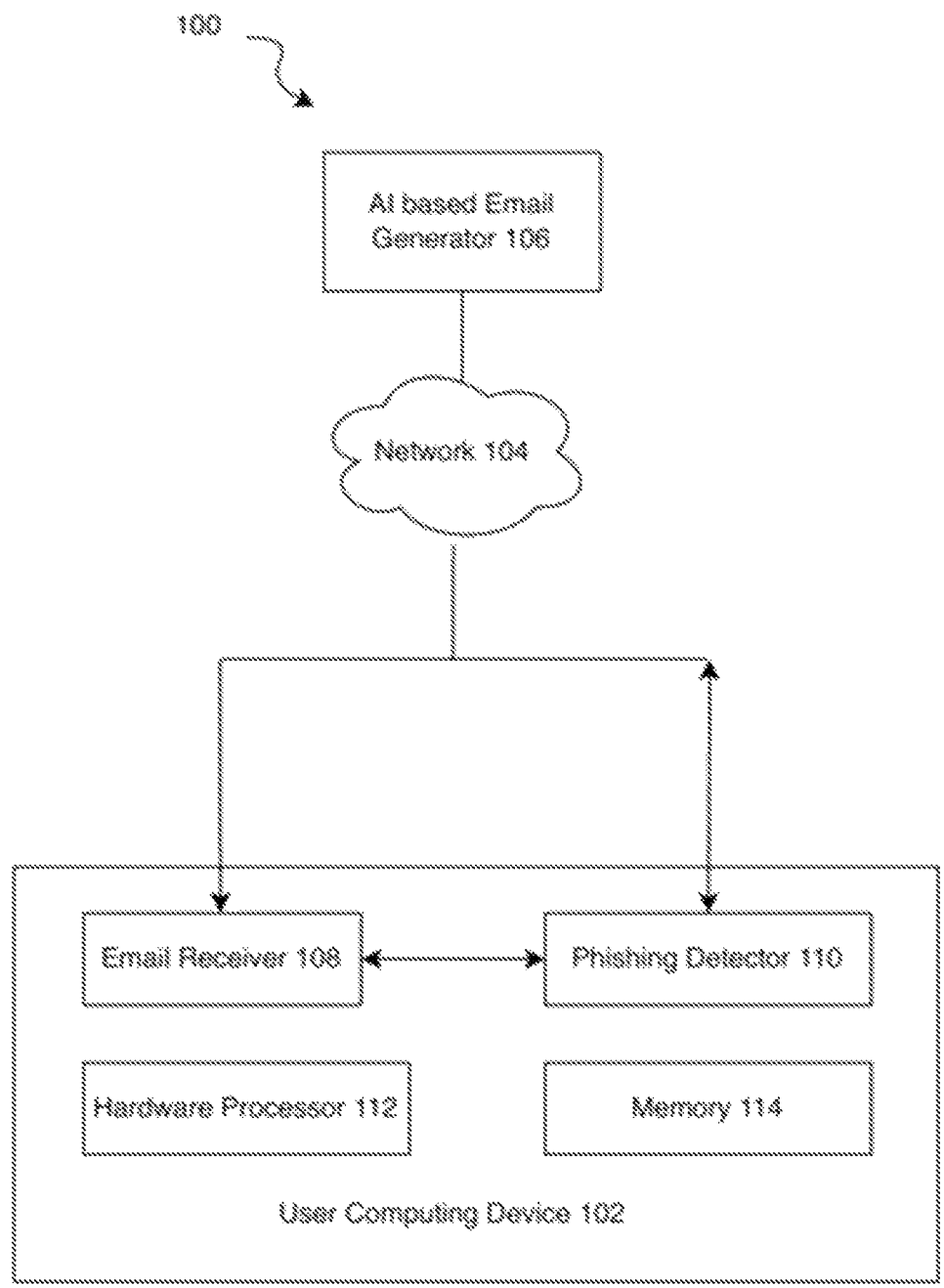
FIG. 1 is a block diagram of a system for detecting malware and phishing electronics mails, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present disclosure is directed to effective detection of the malware and phishing emails. AI-generated phishing emails are highly sophisticated and are prone to continuous evolution. The present disclosure utilizes a combination of malware detection and phishing detection along with an analysis of various aspects of email content. Based on the analysis and generated scores, embodiments can detect AI-generated malicious or phishing emails more effectively.

Referring to FIG. 1, a block diagram of a system 100 for detecting malware and phishing electronics mails, in accordance with an embodiment. In one example, phishing emails can include those generated by artificial intelligence.

The system 100 includes, but may not be limited to an AI based email generator 106 and a user computing device 102 communicatively coupled to the AI based content generator through a network 104. In one embodiment, the user computing device 102 includes, but may not be limited to, one or more email receivers 108 and a phishing and malware detector 110 implemented on a hardware processor 112 and an operably coupled memory 114.

The AI based email generator 106 is an AI based module trained to generate phishing emails, or insert a malicious component into email content. A wide variety of platforms have allowed different aspects of AI to develop. Advances in deep artificial neural networks and distributed computing have led to a proliferation of software libraries, including deep learning. Platforms such as writemail, hypotenuous, rytr and such offer assistance to a user for writing email. The AI platforms may generate one or more emails as per user instructions to incorporate malicious and phishing content. A user, alternatively referred to as a sender, may generate such emails with high sophistication to mimic genuine email content. Such AI generated phishing emails are sent to a recipient such as email receiver 108.

In addition to the multiple simulated phishing emails, various forms of text based communication can be generated by AI based email generator 106. For example, text messages, Internet based communications, Internet content, and other combinations of messages using machine learning algorithms or other forms of artificial intelligence can be generated. In some embodiments, the phishing messages of a generated by an AI generator may be intended to lure the user to perform a different requested action, such as selecting a hyperlink in an email or text message.

In one embodiment, such AI generated emails are sent to the email recipient 108 through at least one electronic system (not illustrated in FIG. 1). The electronic system can be operated by a user or an email sender, in one example. In another example, the electronic system can be operated by an automated email sending module. Examples of an electronic system includes, but are not limited to, Office365/Outlook, Slack, LinkedIn, Facebook, Gmail, Skype, Google Hangouts, Salesforce, Zendesk, Twilio, or any communication platform capable of providing electronic messaging services (e.g., send, receive, and/or archive electronic messages) to users or email recipients. Here, the electronic system can be hosted either on email servers (not shown) associated with the entity or on services/servers provided by a third party. The electronic messages being exchanged on the electronic system can include emails, instant messages, short messages, text messages, phone call transcripts, and social media posts, etc.

The electronic system is configured to deliver the emails to the recipient 108 through the network 104. The network 104 may include certain communication protocols, such as TCP/IP, http, https, ftp, and sftp protocols, over one or more communication network 104. Here, the communication network 104 can be but is not limited to, internet, intranet, wide area network 104 (WAN), local area network 104 (LAN), wireless network 104, Bluetooth, WiFi, and mobile communication network 104. The user computing device 102 can be utilized by system users to interact with (e.g., send or receive electronic messages to and from) the electronic system through the network 104. In some embodiments, the user computing device 102 is a mobile/hand-held device, such as a tablet, iPhone, iPad, Google's Android device, and/or other types of mobile communication device, PC, such as laptop PC and desktop PC, and a server machine.

In one embodiment, the user computing device 102 includes a phishing detector 110 configured to intercept the emails received by the recipient 108 on the user computing device 102 and analyze the email content to detect the presence of a malware component or phishing characteristics. In one embodiment, the user computing device 102 further includes a digital computer or microprocessor 112(*s*) programmed according to the present embodiment. Embodiments described herein may also be implemented by the preparation of integrated circuits or by interconnecting an appropriate network 104 to operably couple system components, such as AI based email generator 106 and user computing device 102.

The system 100 of the present disclosure is at least partially embodied in the form of computer-implemented processes and apparatus for practicing those processes. The disclosed methods are also at least partially embodied in the form of tangible, non-transitory machine-readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. When implemented on the processor 112, the computer program code segments configure the processor 112 to create specific logic circuits. The methods may alternatively be at least partially embodied in a digital signal processor 112 formed of application specific integrated circuits for performing the methods.

Figure 2:
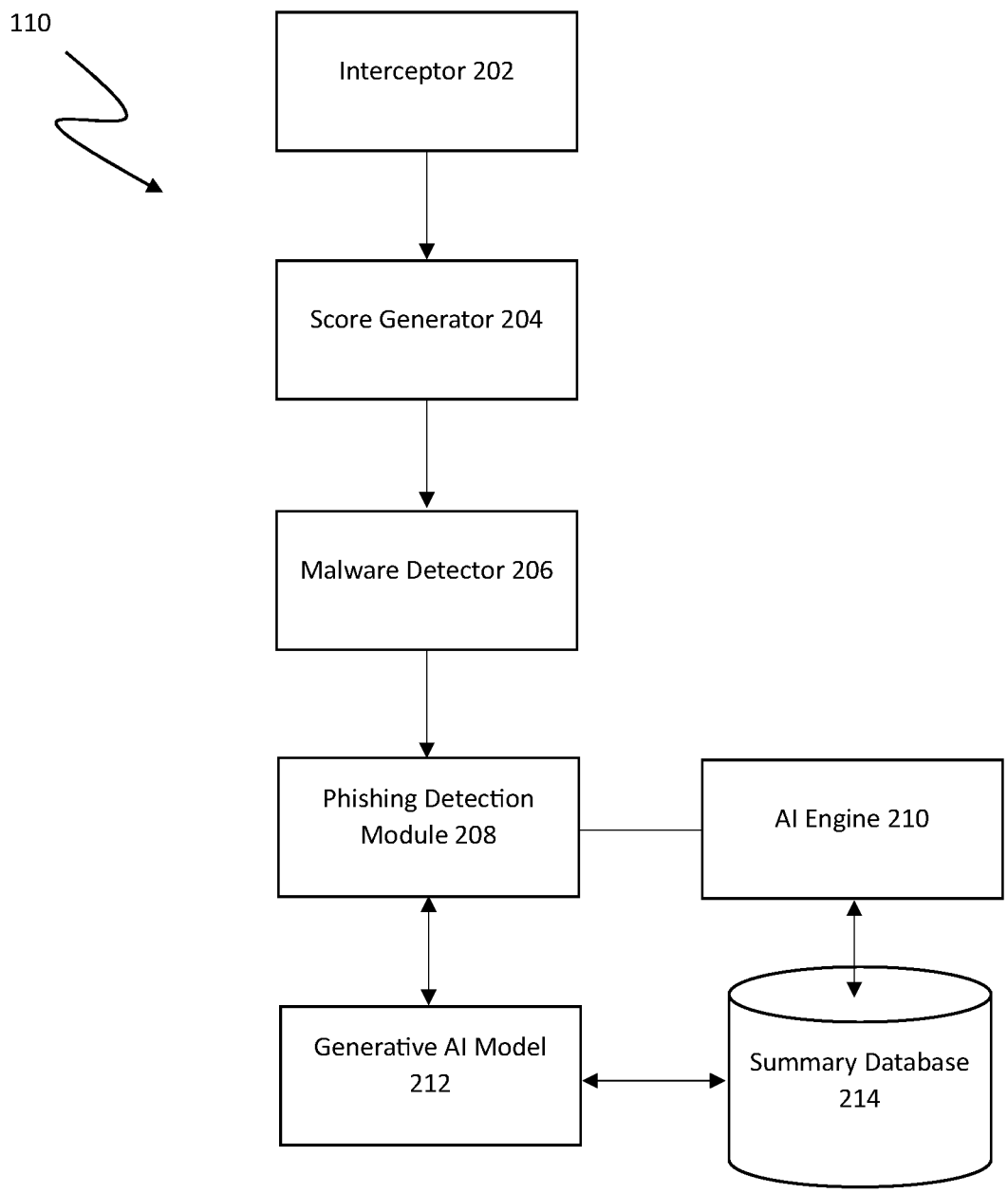
FIG. 2 is a block diagram of a phishing detector, in accordance with an embodiment.

Referring to FIG. 2, a block diagram of a phishing detector 110 is depicted, in accordance with an embodiment. The phishing detector 110 is configured to detect phishing emails (including those generated by AI) with high sophistication. As described above, phishing emails can be made to vary and be unique among large groups. For example, AI generated emails are often missed by conventional solutions which are trained to analyse the entire content body and compare the whole content with a database storing the malicious content. However, with sophistication and evolution of AI, conventional systems fail to detect emails generated to mimic genuine emails as phishing emails. In contrast, the phishing detector 110, in accordance with an embodiment, is configured to analyze a summary, generated based on various attributes of the content, and determine whether the content is phishing content or not. The phishing detector 110 includes, but may not be limited to, an email interceptor 202, an evaluator, a score generator 204, a malware detection module 206, a phishing detection module 208 and a summary AI engine 210.

According to one embodiment, the email interceptor 202, alternatively referred to as an interceptor 202, is configured to intercept incoming email messages for analysis. The interceptor 202 can implement various methods, such as inline interception of new messages, interacting with the email server or inbox through Application Programming Interfaces (APIs), or operation on or with the email server before the message is moved to the recipient's inbox. For instance, the interceptor 202 can intercept the emails through inline interception where the email messages are intercepted in transit before they reach the recipient's inbox. Alternatively, the interceptor 202 can interact with the email server or the email inbox through APIs to access incoming email messages. In another embodiment, the interceptor 202 executes directly on the email server, analyzing email messages before they are moved to the recipient's inbox. The intercepted emails are evaluated by the evaluator.

In accordance with an embodiment, the evaluator is configured to analyze the email message using static attributes to detect the presence of malware. The static attributes can include header information, sender reputation, email server reputation, URLs in the body, attachments, and keyword search of the message body.

According to one aspect, the header information includes header parameters or attributes, such as Sender Policy Framework (SPF) that verifies if the email comes from a domain authorized by the domain owner, DomainKeys Identified Mail (DKIM) which ensures the email was not altered in transit, Domain-based Message Authentication, Reporting & Conformance (DMARC) which builds on SPF and DKIM and specifies what to do if an email fails these checks.

According to one aspect, the evaluator is configured to check the reputation of the email sender. If the sender has a history of sending spam or malicious emails, the system 100 will flag the email as potentially dangerous. In embodiments, sender reputation can be determined by comparison of sender information against various databases and blacklists.

According to one aspect, the evaluator is configured to check the reputation of the email server from which the email was sent. Such checks are similar to the evaluator check of the reputation of the email sender. For example, servers known for sending spam or hosting phishing sites will have a poor reputation.

According to one aspect, the evaluator is configured to analyze any URLs present in the email body. The evaluator can check if these URLs lead to known malicious websites or if the URLs are using common phishing tactics like URL masking.

According to one aspect, the evaluator is configured to scan any attached files for known types of malware or suspicious file types. For example, an unexpected.exe file from an unknown sender would result in a flag as suspicion of malware.

According to one aspect, the evaluator is configured to keyword search the message body. In an embodiment, keyword searching can include scanning the text of the email for common phishing phrases or suspicious language. For example, phrases like "urgent action required" or "verify your account" could be flagged as suspicion of malware.

If the evaluator identifies the email as malicious (e.g. because it contains a known phishing URL from a blocklist, then the email is blocked and the content is passed to the summary AI engine 210 (as will be further described). However, if the email is not found to be malicious by the evaluator, operation is passed to the score generator 204.

In an embodiment, based on the evaluation performed by the evaluator, the score generator 204 calculates a reputation score for the email message. This score represents the likelihood of the email containing a malicious component.

The system 100, in accordance with the present embodiment, is configured to first detect the presence of a malware component. More particularly, the malware detection module 206 is configured to use the reputation score generated by the score generator 204 to determine if the email message contains a malicious component. The reputation score is a measure of the likelihood of the email being malicious, based on the evaluation of static attributes of the email message by the evaluator. If the reputation score indicates a high likelihood of malicious content, the malware detection module 206 blocks the email message. The malware detection module 206 uses advanced algorithms and machine learning techniques to accurately identify various types of malware, including viruses, worms, trojans, ransomware, and spyware. The malware detection module 206 is configured to detect both known malware, using signature-based detection, and unknown malware, using heuristic and behavior-based detection. In one aspect, if the malware detection module 206 fails to detect the presence of the malware component, the email message is analyzed further to detect phishing characteristics. The present disclosure includes various aspects related to phishing and malware, characteristics of those aspects differ in terms of the intentions and context of each aspect.

In one example, characteristics of spear-phishing attack are an attack similar in nature to a phishing attack, sent to one and only one recipient. Such attacks usually come from unknown, suspicious or malicious senders targeting recipients holding senior or sensitive positions within the enterprise.

In another example, characteristics of malware-link include an URL that downloads a binary file, and for which the IP address, domain name or the full URL might have malicious history associated with it that can be looked up in a database. Accordingly, a behavioral analysis of the URL-clicking on it and recording the redirects and the resulting IP address may result in discovery of malicious history.

In yet another example, characteristics of malware attachment includes an attachment that is known to be malicious through the database lookup. Known malicious attachments can include a particular (suspicious) binary format, or which contains known malicious URL link(s).

In yet another example, emails containing malicious message derived attributes are considered as malicious emails. The message derived attributes include a classification of the message as spam, email marketing, newsletter, suspicious, malicious (e.g., phishing, spear phishing, slow-and-low-attack, malicious link, malicious attachment), and the like.

In another example, characteristics of suspicious messages indicate if the message is sent by a suspicious sender, or the message is sent by an unknown sender and the message contains link(s) or attachment(s), then the message is marked as a suspicious message.

In yet another example, characteristics of malicious message indicate if the message is sent by a malicious sender, or the sender attributes, do not conform to a sender profile, or the message contains link(s) or attachment(s) that are deemed malicious by the database. In such examples, the message is marked as a malicious message.

In accordance with an embodiment, the phishing detection module 208 is configured, if the malware detection module 206 does not find a malicious component in the email message, to analyze a trust graph of the sender-receiver pair. The trust-graph is created based on examining the history of interactions between the sender and receiver, including factors such as whether the user has ever received an email from this sender before, whether the receiver replied to the previous email, and whether the communication was initiated by the user. For example, phishing detection module 208 can implement a pre-trained model of relationships between sender and receiver. Based on this analysis, the phishing detection module 208 generates a trust score. The higher the level of interaction between the sender and receiver, the higher the trust score. The trust relationship between the sender and receiver can be determined based on a pre-trained trust graph module (not shown in the figure). In one aspect, a predefined threshold is determined based on an acceptable limit indicating the trustworthiness of the content. The trust score is compared with the predefined threshold to determine the trustworthiness of the email content. The phishing detection module 208 also determines if the email message was written by AI using a generative AI model 212 trained on a large language model (LLM). Phishing detection module 208 in coordination with the generative AI model 212 can therefore identify sophisticated phishing attacks where AI is used to craft convincing phishing emails. If the email message is written by AI, then the email message is further analyzed to generate a certainty score.

In one embodiment, if based on the trust graph (and according to a certain trust score, in embodiments), it is determined that the email message is a trusted message. A trusted message indicates that the message is from a known or trusted sender and the sender attributes conform to the sender profile. For example, attributes including time of day when messages are usually sent by this sender, IP Address and/or hops usually taken by the messages sent by the sender etc., and that the message does not contain any malicious links or malicious attachments, then the message is marked as a trusted message.

In another embodiment, if the email message is characterized as not a trusted message, the email message is analyzed by the generative AI model 212 coupled to the phishing detection module 208. In this embodiment, the email message is analyzed by the generative AI model 212 in order to determine if the email text was written by an AI module. In an embodiment, the generative AI model 212 can determine that the email was written by AI. In another embodiment, the generative AI model 212 can determine a suspicion of maliciousness based on the generative AI model 212 being pre-trained to detect the intention and context of the email being of a malicious character.

In accordance with an embodiment, the score generator 204 is further configured to generate a certainty score, upon determination of the email message being written by AI. A certainty score indicates the likelihood of the intentions and context of the email message being malicious. A predefined certainty threshold can be utilized in indicating an acceptable limit of the certainty. The certainty score is compared with the certainty score threshold. If the certainty score is higher than the threshold, then, the email message is further analyzed to generate a combined reputation score.

In accordance with an embodiment, if the certainty score is higher than a predefined certainty threshold, the score generator 204 is configured to combine the reputation score, trust score, and certainty score to generate a combined score. This combined score represents the overall likelihood of the email message being malicious. A combined score threshold is predefined to indicate an acceptable limit of the combined score, in one embodiment. The generated combined score is compared with the combined score threshold. If the combined score is higher, the email message is blocked. If the combined score is lower than the predefined combined threshold, a plurality of summaries of the content of the email message are generated using a summary AI engine 210.

In one embodiment, the summary AI engine 210 is configured to generate a plurality of summaries of the content of the email message. These summaries are then compared against summaries of known malicious emails stored in a summary database 214. The summary database 214 stores the known malicious emails and their summaries for comparison. Data in the summary database 214 is used by the summary AI engine 210 to identify similarities between the incoming email message and previously identified malicious emails.

In one aspect, the summary AI engine 210 is based on a large language model (LLM). The summary AI engine 210 is configured to create multiple short summaries of the text of the email. The length and quantity of the summaries can be preconfigured. For example, the summary AI engine 210 can be asked to create a 3 word, a 5 word and a 20 word summary of the email. For example, text strings such as the 3-word summary "package not delivered", 5-word summary "package not delivered unpaid fees", and 20-word summary "Package with tracking number 92200182560208835 could not be delivered due to unpaid customs fees and the instructions for payment will follow below" are generated by the summary AI engine 210. These n-tuples of words are then used to search for similar messages in the database 214. The system 100 (e.g. the generative AI model 212) starts by searching for the lowest tuple of words (e.g. here, a 3-tuple) in the database. If a match is found, then the message is retrieved and compared. If too many hits occur, then the next larger tuple of words can be used to further filter down the amount (in our example, the 5-tuple of words, and a search for it would reduce the number of hits. Efficiencies are therefore created in the dynamic searching of the summary database 214 using multiple n-tuples.

The generative AI model 212 can then check if the newly received email is very similar to one identified in the summary database 214. The system 100 can use the full email text body, or just an n-tuple summary for comparison. In an embodiment, the summary database 214 is preconfigured with known malicious emails from a training set. In embodiments, the summary database 214 can be updated to mark similar emails to known malicious ones as malicious in order to more effectively categorize subsequent searches. In one aspect, the n-tuple pairs generated by summary AI engine 210 are written to the summary database 214 for subsequent searches. In embodiments, the system 100 can use the score of the previous engines as additional decision help.

According to one embodiment, if the email message is already marked malicious from a previous engine then the entry in the summary database 214 will be marked as malicious for future searches. If the email message is not recognized as malicious by the previous engines, and there are no or only a few similar messages found, then the score of the above engines is used to define the final verdict and the entry in the database is either left as unknown or as clean if the score is below a threshold.

In another embodiment, if generative AI model 212 determines many similar emails in summary database 214, but none of them are classified as phishing or malicious, then a counter can be used to check if there are too many similar emails received in a certain time period. If a limit of the counter is reached the system 100 can start blocking such similar emails or reporting them to the administrator depending on the configuration of the system 100.

In some embodiments, the generative AI model 212 is further configured to allow a user to search for blocked emails. For example, if the user is expecting an email from an online video subscription service but didn't receive any, then the user can send a request in natural language to the generative AI model 212 asking if there was an email from the video subscription service. The generative AI model 212 then processes the request and checks the summary database 214 if there was any email with this description filtered. If yes, then the system 100 can inform the user, and, depending on the trust score, automatically provide the email, or ask an administrator to approve the restore.

The generative AI model 212 can also be used, in accordance with one embodiment, to generate synthetic malicious email texts for training purposes. For this purpose, the generative AI model 212 can take a confirmed malicious email, such as a phishing email, and ask the large language module to generate various variations of the text in the top X languages of concern for the customer. These training emails can then be used to test existing email security solutions or to feed the summary database 214 of short summaries for subsequent re-training of summary AI engine 210.

Figure 3A:
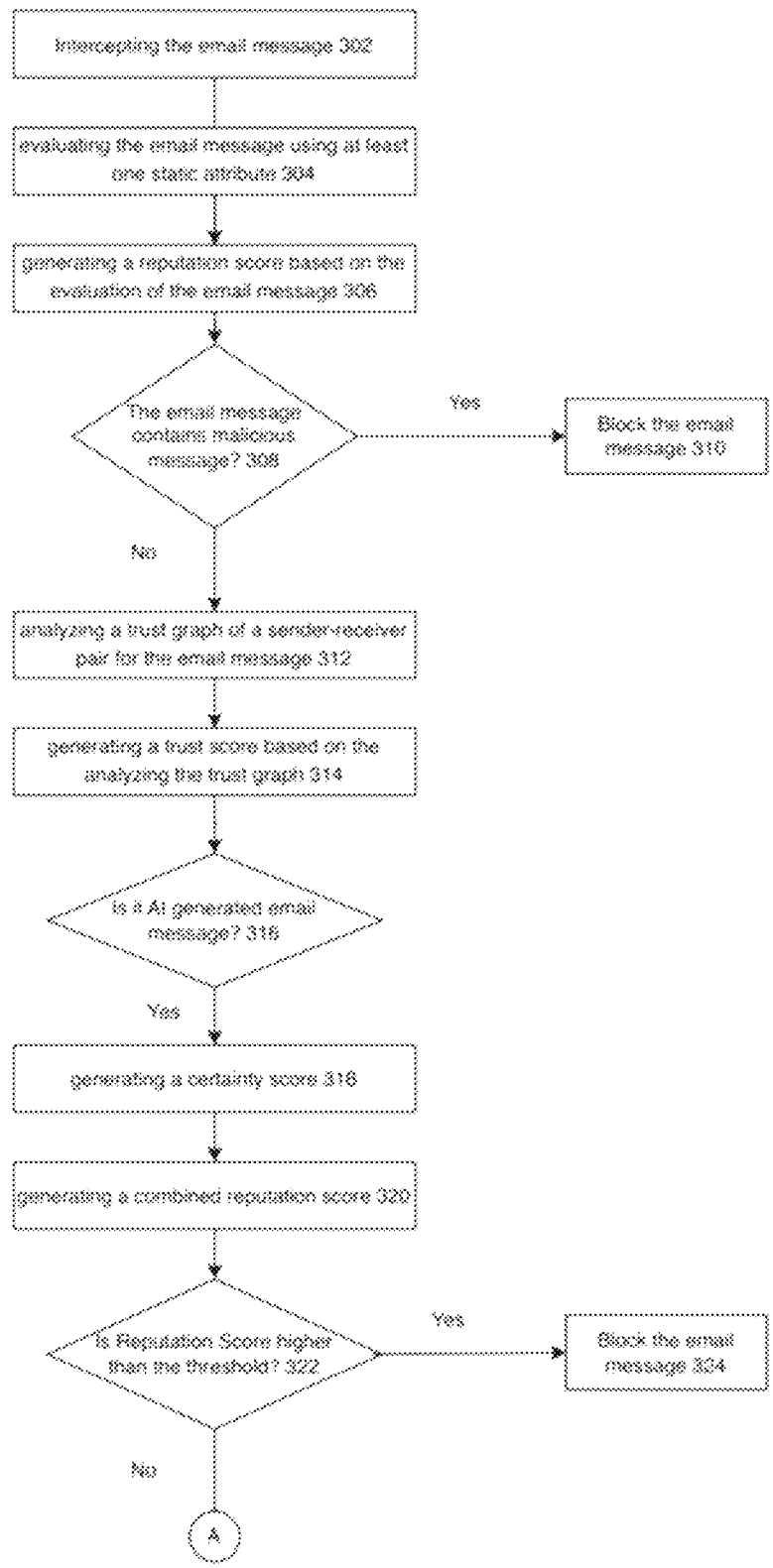
FIGS. 3A-3B are a flowchart of detection of the malware and phishing emails, in accordance with an embodiment.
Figure 3B:
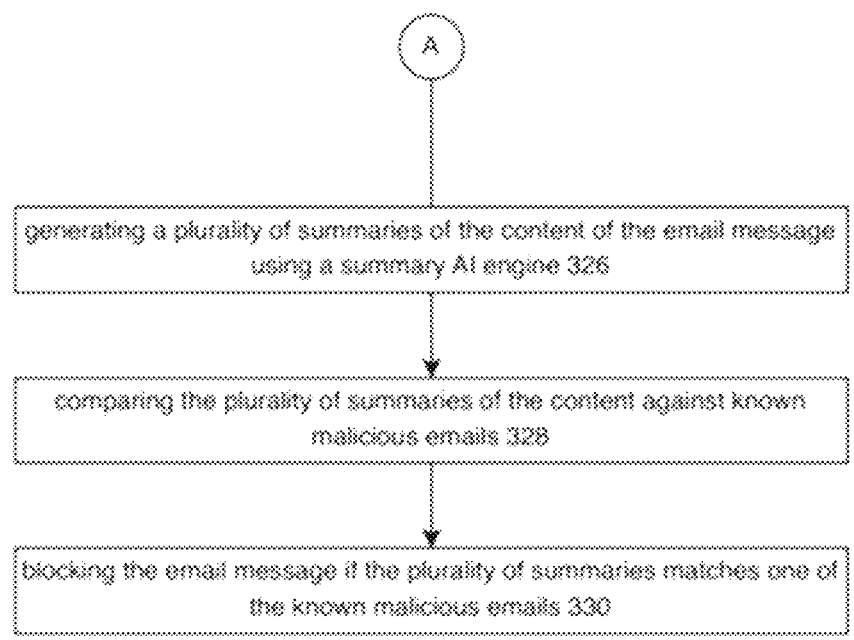

Referring to FIGS. 3A-3B, a flowchart of detection of malware and phishing emails is depicted, in accordance with an embodiment. The operations involved in the malware and phishing emails are implemented using the system 100 components as described with reference to FIGS. 1-2.

At block 302, an email message is intercepted. For example, emails sent through an electronic system and received at the user computing device 102 by the email recipient can be intercepted at any point during the email generation, transmission, and/or receipt process by interceptor 202.

At block 304, the email message is evaluated using at least one static attribute. For example, the evaluator can evaluate the intercepted email message based on at least one static attribute such as header, URL.

At block 306, a reputation score is generated. For example, score generator 204 can generate a reputation score.

At block 308, an evaluation is made based on the reputation score to determine whether the email message contains the malicious component. For example, malware detection module 206 can use the reputation score generated by the score generator 204 to determine if the email message contains a malicious component (e.g. against a threshold, based on heuristics, signature-based detection, behavior-based detection or other determination).

If the email message is determined to contain the malicious component, then the email message is blocked, at block 310.

If the presence of the malicious component is not found, then the email message is further analyzed against a trust graph of a sender-receiver pair for the email message at block 312. In an embodiment, a trust graph can first be generated for subsequent analyzing.

Based on the analysis performed at block 312, a trust score is generated at block 314. For example, phishing detection module 208 can generate a trust score using the trust graph.

At block 316, a determination is made to check if the email message is generated by AI. For example, the phishing detection module 208 can determine if the email is generated by AI using the generative AI model 212.

At block 318, a certainty score is generated for the email message. The certainty score is compared with a predefined threshold, and if the value of the certainty score is higher than the predefined threshold, then a combined score is generated at block 320. For example, the score generator 204 can generate the certainty score. Further, the score generator 204 can combine the reputation score, trust score, and certainty score to generate a combined score.

At block 322, a determination is made as to the combined score. If the combined score is higher than a predefined threshold value, then the email message is blocked at block 324.

At block 326, if the combined score is lower than the threshold, a plurality of summary of the content of the email message is generated using the summary AI engine 210.

At block 328, the plurality of summaries of the content is compared against known malicious emails. For example, the generative AI model 212 can check if the email is similar to one identified in the summary database 214 (e.g. based on n-tuples searching).

At block 330, the email message is blocked (or alternatively, flagged) if the plurality of summaries matches one of the known malicious emails.

Figure 4:
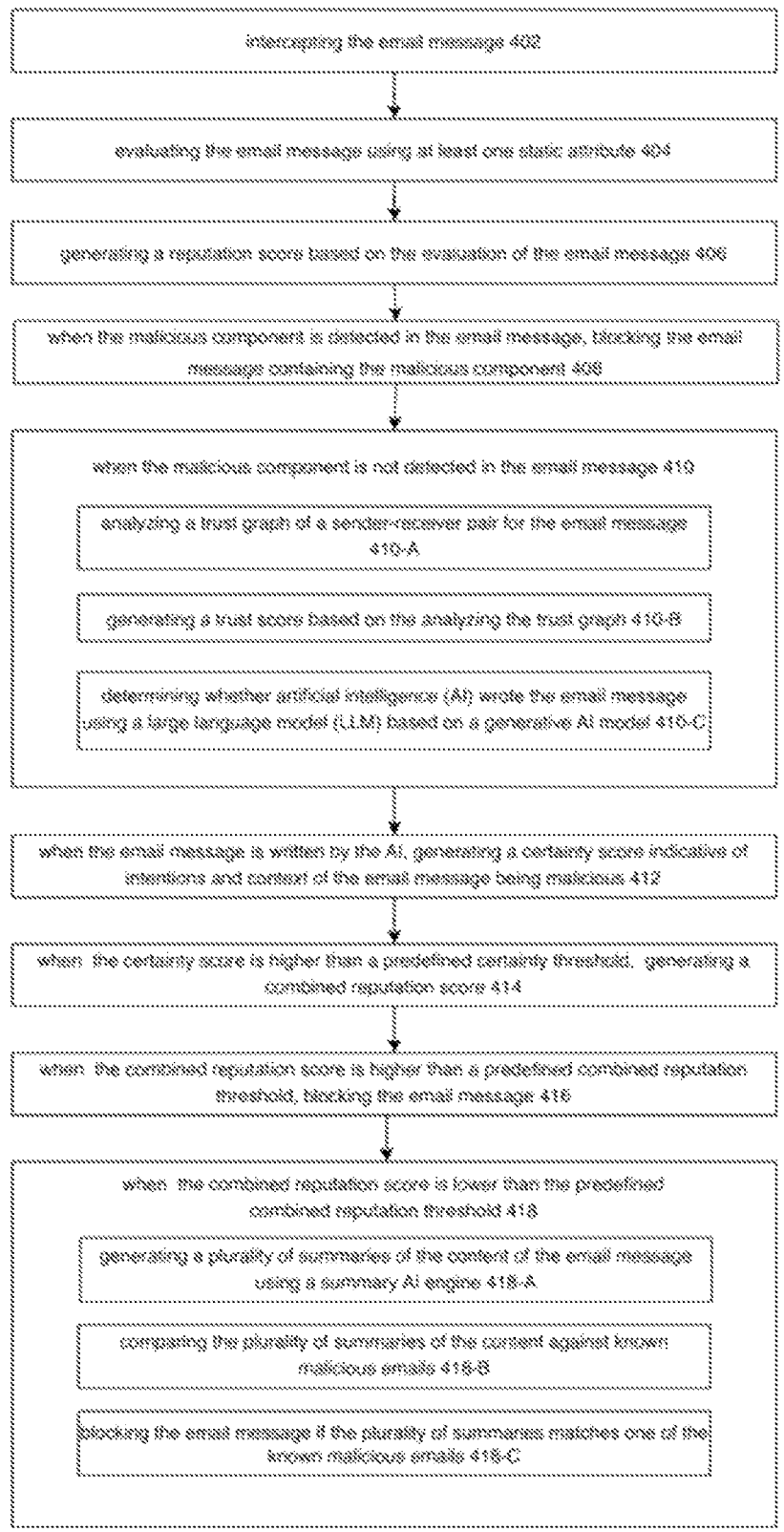
FIG. 4 is a flowchart of a method for detection of malicious and phishing emails, in accordance with an embodiment.

Referring to FIG. 4, a flowchart of a method 400 for detecting malware and phishing emails is depicted, in accordance with an embodiment.

At 402, the method 400 includes intercepting the email message sent from the electronic system and received by the email recipient 108 at the user computing device 102.

At 404, the method 400 includes evaluating the email message using at least one static attribute.

At 406, the method 400 includes generating a reputation score based on the evaluation of the email message. Further, method 400 determines whether the email message contains the malicious component. In an embodiment, method 400 can determine malicious components based on the static attribute evaluation and/or the reputation score evaluation.

At 408, the method 400 includes blocking the email message containing the malicious component, when the malicious component is detected in the email message.

At 410, the method 400 includes, when the malicious component is not detected in the email message, analyzing a trust graph of a sender-receiver pair for the email message at 410-A, generating a trust score based on the analyzing the trust graph at 410-B, and determining whether artificial intelligence (AI) wrote the email message using a large language model (LLM) based on a generative AI model at 410-C.

At 412, the method 400 includes, when the email message is written by AI, generating a certainty score indicative of intentions and context of the email message being malicious.

At 414, the method 400 includes, when the certainty score is higher than a predefined certainty threshold, generating a combined score by combining the reputation score, the trust score, and the certainty score.

At 416, the method 400 includes blocking the email message when the combined score is higher than a predefined combined threshold.

At 418, the method 400 includes, when the combined score is lower than the predefined combined threshold, generating a plurality of summaries of the content of the email message using a summary AI engine 210 (418-A), comparing the plurality of summaries of the content against known malicious emails (418-B), and blocking the email message if the plurality of summaries matches one of the known malicious emails (418-C).

The invention claimed is:

1. A method of detecting a phishing attack in an email message, the method comprising:
   intercepting the email message;
   evaluating the email message using at least one static attribute;
   generating a reputation score based on the evaluation of the email message, and detecting, based on the reputation score, whether the email message contains a malicious component; and
   when the malicious component is detected in the email message:
      blocking the email message containing the malicious component;
   when the malicious component is not detected in the email message:
      analyzing a trust graph of a sender-receiver pair for the email message,
      generating a trust score based on the analyzing the trust graph,
      determining whether artificial intelligence (AI) wrote the email message using a large language model (LLM)-based generative AI model,
      when the email message is written by the AI, generating a certainty score indicative of intentions and context of the email message being malicious,
      when the certainty score is higher than a predefined certainty threshold,
         generating a combined score by combining the reputation score, the trust score, and the certainty score,
      when the combined score is higher than a predefined combined threshold:
         blocking the email message,
      when the combined score is lower than the predefined combined threshold:
         generating a plurality of summaries of content of the email message using a summary AI engine, wherein at least one of the plurality of summaries of content is generated using an n-tuple pair,
         comparing the plurality of summaries of content against known malicious emails, and
         blocking or marking the email message if the plurality of summaries matches one of the known malicious emails;
   generating synthetic malicious email text using the generative AI model; and
   testing an email security solution using the synthetic malicious email text.

2. The method of claim 1, wherein analyzing the trust graph of the sender-receiver pair further comprises using a pre-trained model based on a relationship of the sender-receiver pair.

3. The method of claim 1, further comprising training the generative AI model with:
   recent malicious emails, clean emails, and historical data from a customer environment.

4. The method of claim 1, wherein the at least one static attribute includes header information including at least one of a Sender Policy Framework (SPF) record, a Domainkeys Identified Mail (DKIM) record, a Domain-based Message Authentication Reporting and Conformance (DMARC) record, a reputation score for the sender, an email server, a URL in a message body, an attachment, or a keyword search of the message body.

5. The method of claim 1, further comprising:
   detecting similarities in a plurality of email messages using the generative AI model;
   initiating, if the similarities are above a predefined limit and the plurality of email messages are not identified as malicious, a counter to count a number of similar email messages in a predefined time period; and blocking the plurality of email messages if the number is beyond a predefined limit.

6. The method of claim 1, further comprising:
receiving a search request from a user for a particular email message in blocked emails;
when the particular email message is found, using the generative AI model, in the blocked emails:
informing the user, and
depending on the trust score, automatically retrieving the email message from the blocked emails or asking the administrator to approve the retrieval of the particular email message from the blocked emails.

7. The method of claim 1, further comprising:
determining whether the email message was already marked malicious from a previous determination; and
when the email message was declared malicious, marking the email message as malicious for future searches.

8. The method of claim 1, wherein the summary AI engine is retrained using the synthetic malicious email text.

9. The method of claim 1, wherein the email message is intercepted during at least one of email generation, transmission, or receipt.

10. A system for detecting a phishing attack in an email message comprising:
a hardware processor implemented on a computing device; and
instructions that, when executed on the hardware processor, cause the hardware processor to implement:
an interceptor configured to intercept the email message,
an evaluator to configured evaluate the email message using at least one static attribute,
a score generator configured to generate a reputation score based on the evaluation of the email message,
a malware detector configured to detect, based on the reputation score, whether the email message contains a malicious component, and configured to block the email message containing the malicious component when the malicious component is detected in the email message;
a phishing detector configured to, when the malicious component is not detected in the email message:
analyze a trust graph of a sender-receiver pair for the email message,
generate a trust score based on the analyzing the trust graph,
determine whether artificial intelligence (AI) wrote the email message using a large language model (LLM)-based generative AI model,
when the email message is written by the AI, generate a certainty score indicative of intentions and context of the email message being malicious,
when the certainty score is higher than a predefined certainty threshold, generate a combined score by combining the reputation score, the trust score, and the certainty score,
when the combined score is higher than a predefined combined threshold:
block the email message,
when the combined score is lower than the predefined combined threshold:
generate a plurality of summaries of content of the email message using
a summary AI engine including by instructing the summary AI engine to generate
a summary using an n-tuple pair,
compare the plurality of summaries of content against known malicious emails, and
block the email message if the plurality of summaries matches one of the known malicious emails;
wherein the generative AI model is further configured to generate synthetic malicious email text, and wherein the phishing detector is further configured to test an email security solution using the synthetic malicious email text.

11. The system of claim 10, wherein the phishing detector is further configured to analyze the trust graph of the sender-receiver pair using a pre-trained model based on a relationship of the sender-receiver pair.

12. The system of claim 10, wherein the generative AI model is trained with:
recent malicious emails, clean emails, and historical data from a customer environment.

13. The system of claim 10, wherein the at least one static attribute includes header information including at least one of a Sender Policy Framework (SPF) record, a Domainkeys Identified Mail (DKIM) record, a Domain-based Message Authentication Reporting and Conformance (DMARC) record, a reputation score for sender, an email server, a URL in a message body, an attachment, or a keyword search of the message body.

14. The system of claim 10, wherein the phishing detector is further configured to:
detect similarities in a plurality of email messages using the generative AI model,
increment, if the similarities are above a predefined limit and the plurality of email messages are not identified as malicious, a counter to count a number of similar email messages in a predefined time period, and
block the plurality of email messages if the number is beyond a predefined limit.

15. The system of claim 10, wherein the phishing detector is further configured to:
receive a search request from a user for a particular email message in blocked emails; and
when the particular email message is found in the blocked emails:
inform the user, and
depending on the trust score, automatically retrieve the email message from the blocked emails or ask the administrator to approve the retrieval of the particular email message from the blocked emails.

16. The system of claim 10, wherein the phishing detector is further configured to:
determine whether the email message was already marked malicious from a previous determination, and
if the email message was declared malicious, mark the email message as malicious for future searches.

17. A generative artificial intelligence (AI) model pre-trained on a large language model (LLM) based on data related to phishing emails, wherein the generative AI model is trained to, including:
determine if artificial intelligence wrote an intercepted email;
search an email summary database using a first n-tuple applied to a summary of the intercepted email to determine if the intercepted email is similar to at least one of a plurality of emails in the email summary database;
generate a plurality of synthetic emails based on the intercepted email to input into the email summary database; and test an email security solution using the plurality of synthetic emails.

18. The generative AI model of claim 17, wherein the generative AI model is further trained to: search an email summary database using a second n-tuple to determine if the intercepted email is similar to at least one of a plurality of emails in the email summary database, wherein the second n-tuple includes a greater number of words in the tuple than the first n-tuple.

19. The system of claim 10, wherein the summary AI engine is retrained using the synthetic malicious email text.

20. The system of claim 10, wherein the interceptor is configured to intercept the email message during at least one of email generation, transmission, or receipt.

* * * * *